Feb. 23, 1965 S. DENIS 3,170,196
GRATE FOR BALE RASP
Filed July 6, 1961 3 Sheets-Sheet 2

INVENTOR.
SAMUEL DENIS.
BY K. A. Mayr
ATTORNEY.

Feb. 23, 1965  S. DENIS  3,170,196
GRATE FOR BALE RASP

Filed July 6, 1961 3 Sheets-Sheet 3

INVENTOR.
SAMUEL DENIS.
BY K.A. Meyer
ATTORNEY.

United States Patent Office 3,170,196
Patented Feb. 23, 1965

3,170,196
GRATE FOR BALE RASP
Samuel Denis, Winterthur, Switzerland, assignor to Rieter Machine Works Ltd., Winterthur, Switzerland, a corporation of Switzerland
Filed July 6, 1961, Ser. No. 122,177
Claims priority, application Switzerland, July 8, 1960, 7,888/60
6 Claims. (Cl. 19—80)

The present invention relates to a grate for a bale rasp as used for reducing fibre bales in spinning plants.

In conventional bale rasps the bale is pushed on a table provided with a grate through which portions of rotating saw-tooth discs forming rasps extend in upward direction and work on the bale. It is known that fibre bales and particularly cotton bales can be effectively worked only parallel to the pressed layers. It has been found that the lowermost layer which rests on the grate and is engaged by the rasp has a tendency to wrinkle and to curl which makes it difficult to work on and reduce the bale.

It is an object of the present invention to provide a grate for a bale rasp which overcomes the difficulties experienced with conventional grates, particularly wrinkling and curling of the surface of the bale which is worked. The grate according to the invention comprises grate bars placed between two bale-supporting surfaces and having ends which are at an elevation higher than the supporting surfaces. The rotating rasp discs extend between the grate bars and the bales move on the bars parallel thereto. The elevated ends of the bars are where the bales leave the grate. This arrangement may be further improved by placing the ends of the bars which ends are not elevated somewhat below the adjacent bale-supporting surface wherefrom the bale moves onto the grate. In bale rasps permitting reciprocating travel of the bales the grate bars are adapted to rock whereby the ends of the bars over which the bales leave the grate are elevated above the bale-supporting surface and the opposite ends of the bars which receive the bales are somewhat below the bale-supporting surface.

The novel features which are considered characteristic of the invention are set forth with particularity in the appended claims. The invention itself, however, and additional objects and advantages thereof will best be understood from the following description of embodiments thereof when read in connection with the accompanying drawing wherein:

Figure 1:
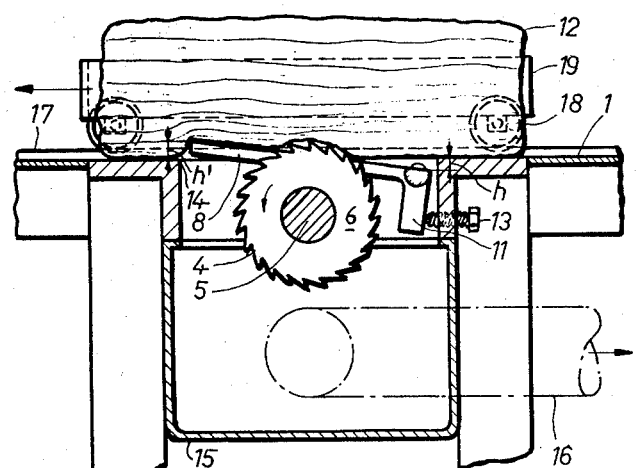
FIG. 1 is a part sectional elevation of a bale rasp according to the invention, the section being made along line I—I of FIG. 2.
Figure 2:
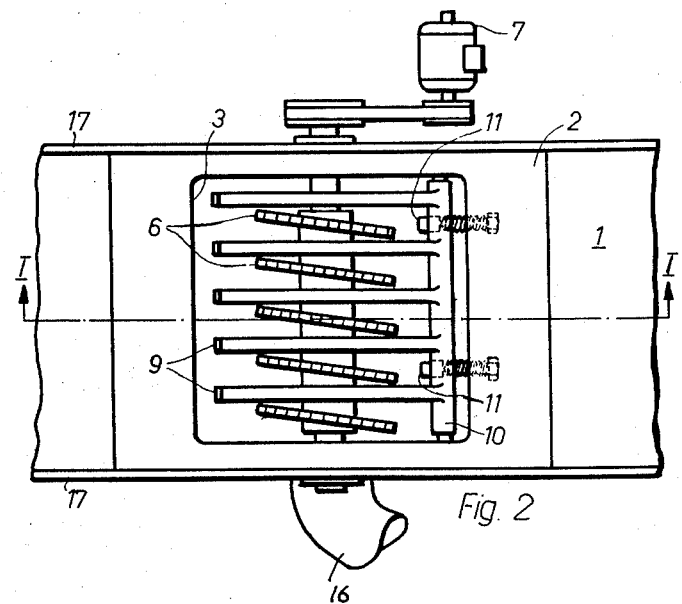
FIG. 2 is a plan view of the bale rasp shown in FIG. 1, the bale and bale carriage being omitted.

Referring more particularly to FIGS. 1 and 2 of the drawing, numeral 1 designates the top of a table comprising a frame 2 having a rectangular opening 3 wherein a bale rasp 4 is rotatably supported. The rasp consists essentially of a shaft 5 on which a plurality of spaced saw-tooth discs 6 are mounted. The discs 6 are placed at an angle different from 90° on the shaft. The latter is driven by a motor 7 (FIG. 2) to rotate counterclockwise as seen in FIG. 1. The elevation of the rasp 4 is so that the points of the teeth of the discs 6 project slightly above the coplanar support surfaces formed by the table 1 at either side of the rasp element 4, 5. A tiltable grate 8 is fitted into the opening 3. The grate has bars 9 extending from a shaft 10 whose ends are swingably supported in the frame 2. Downwardly extending arms 11 are connected to the shaft 10 near the ends thereof. The top edges of the ends of the grate bars which are connected to the shaft 10 are slightly below the plane of the surface of the table 1. The difference in elevation is indicated by the letter $h$ in FIG. 1. The bale 12 resting on the grate 8 presses the grate down and causes abutment of the arms 11 against adjusting screws 13 suitably connected to the frame 2. Manipulation of the screws 13 affords adjustment of the elevation $h'$ of the free ends of the grate bars above an edge 14 of the frame which is in the plane of the top of the table 1. Below the opening of the frame 2 is a hood 15 for receiving the rasped off flakes which are sucked away through a suction duct 16. Rails 17 are mounted on the table parallel to the grate bars for supporting rollers 18 of a bottomless carriage 19 for the bale 12. The carriage is moved from right to left in FIGS. 1 and 2.

Figure 2A:
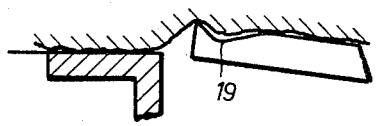
FIG. 2a is a part sectional view of a detail of the grate bar.

The apparatus operates as follows: The bale moves from the right side in FIG. 1 onto the grate and is engaged by the teeth of the rasp discs whereupon it is pushed over the elevated free ends of the grate bars onto the left side of the table 1. During this movement the bale is supported by the table and by the free ends of the grate bars so that the full weight of the bale does not press the bale against the rasps, the reduced pressure facilitating reducing of the bale and effectively preventing curling or rolling-in of the lowermost layer of the bale. The elevated ends of the grate bars have a smoothing effect on the bottom surface of the bale which is torn by the rasp discs and prevent curling of the bottom layer of the bale. This effect is increased by forming the free ends of the grate bars as shown in FIG. 2a, i.e., by providing the upper surfaces of the free ends of the bars with a recess 19.

Figure 3:
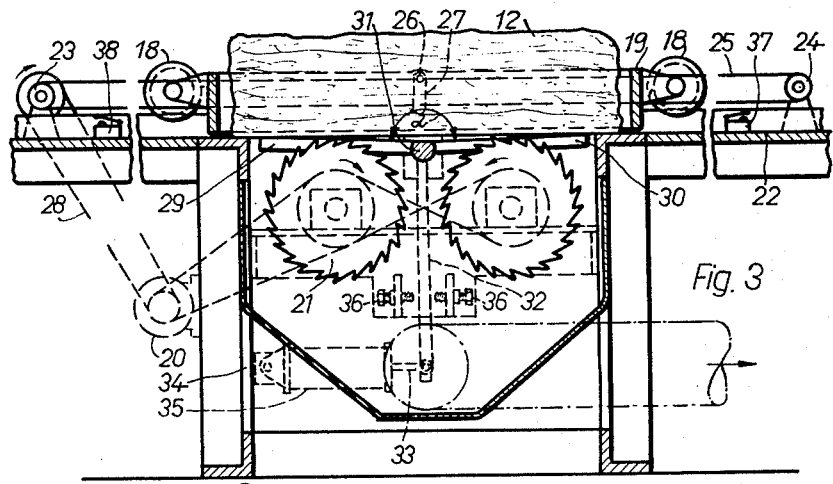
FIG. 3 is a part sectional elevation of a modified bale rasp according to the invention.

In the embodiment of the invention shown in FIG. 3 two rasp elements, each including a plurality of saw-tooth discs 21 are juxtaposed whereby the axes of rotation are parallel. The rasp elements are driven in opposite direction by a belt drive driven by a motor 20. The carriage 19 moving a bale 12 performs a reciprocating motion which is produced by the now described mechanism. At opposed ends of a table 22 rollers 23 and 24 are provided around which moves an endless wire rope 25 provided with a conventional dog 26 adapted to be received in a vertical slot 27 formed on the carriage 19. The roller 23 is turned clockwise by means of the motor 20 through a belt 28.

The grate comprises two groups of grate bars 29 and 30 which are connected to a shaft 31 swingably supported in the center of the frame of the machine in the plane of symmetry of the rasp elements. The upper surfaces of the bars 29 and 30 are placed at an angle $\alpha$ of approximately 170°. A lever 32 extends downward from the shaft 31. The lower end of the lever 32 is pivoted to a piston rod 33 extending from a piston in a cylinder 35 which is swingably connected to the frame 34 of the machine. In order to limit the rocking movement of the lever 32 and the tipping movement of the grate 29, 30, adjustable abutment screws 36 are provided on either side of the lever.

The piston in the cylinder 35 is reciprocated by a pressure fluid whose admission to and release from the cylinder 35 is controlled by valves 37 and 38 which are actuated by the wheels 18 of the carriage 19. The control of the admission of pressure fluid to and removal of pressure fluid from the cylinder 35 is diagrammatically shown in FIG. 6. Pressure fluid is supplied to the system through a pipe 41 which terminates in the center of casing 39 of a piston valve 40. The casing 39 is connected by two conduits 42 and 43 to the ends of the cylinder 35. The ends of the casing 39 are connected by means of pipes 44 and 45 through the valves 38 and 37, respectively, to the pressure fluid supply pipe 41.

The system operates as follows: Upon depression of the left control valve 38 by a roller 18 of the carriage 19 the valve 38 is opened to permit flow of pressure fluid supplied through the conduit 41 to the right side of the piston valve 40 for moving the valve 40 to the extreme left position shown in FIG. 6. In this position the valve 40 permits entry of pressure fluid into the space at the left side of the piston in the cylinder 35 and causes movement of the piston rod 33 into the position shown in dotted lines in FIG. 6. The piston rod 33 and the grate bars 29 and 30 are held in the position shown in dotted lines in FIG. 6 until a wheel 18 at the right side of the carriage 19 engages and opens the valve 37 at the right side of the apparatus. The valve 38 is closed by a spring when not depressed by a wheel of the carriage 19. Since the valve 37 is now open pressure fluid is supplied to the left end of the piston valve 40 and pressure fluid is supplied to the right side of the piston in the cylinder 35 as shown in FIG. 7; the rod 33 and the grate bars 29 and 30 are thereby moved to the position shown in dotted lines in FIG. 7. In the illustrated positions of the apparatus pressure fluid is supplied to the hatched portions in the cylinders 35 and 39.

Figure 5:
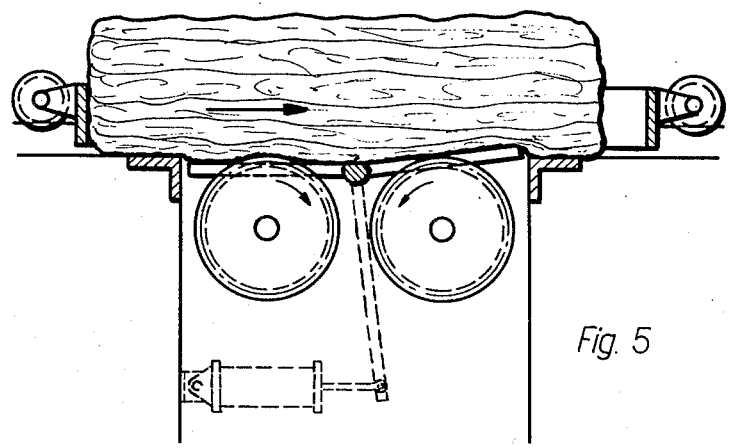
FIGS. 4 and 5 are diagrammatic illustrations of the bale rasp shown in FIG. 3 in different operating positions.
Figure 4:
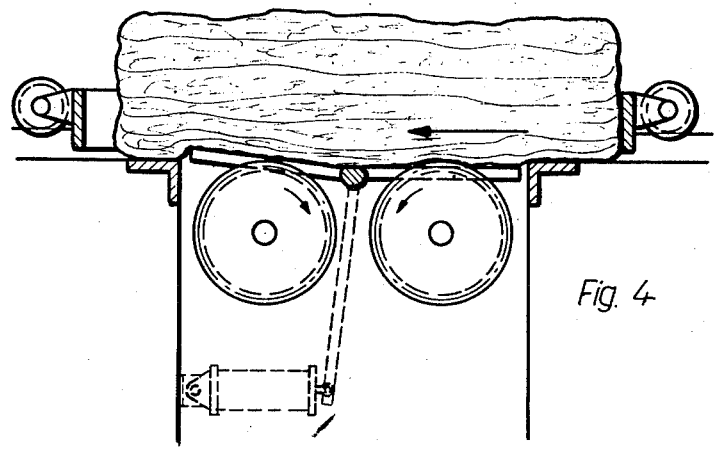
Figure 6:
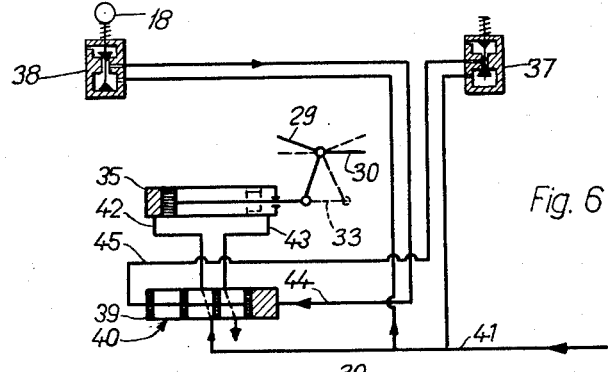
FIGS. 6 and 7 are diagrammatic illustrations of controlled actuating means for moving the grate supporting a bale according to the invention.
Figure 7:
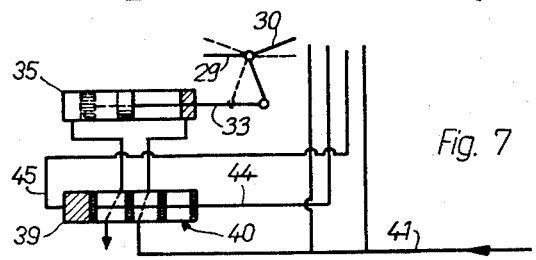

FIG. 4 more elaborately shows the device in the position when the control apparatus is in the position shown in solid lines in FIG. 6 and FIG. 5 more elaborately shows the position of the device when the control apparatus is in the position shown in solid lines in FIG. 7.

I claim:

1. In a bale rasp for reducing fibre bales in spinning plants, a rotating rasp element including a plurality of spaced saw-tooth discs adapted to engage and reduce a fibre bale while moving at a right angle to the rotation axis of said element, a stationary bale support on either side of said rasp element, said supports having coplanar surfaces slidably supporting a bale as it moves from one of said supports onto said rasp element and therefrom onto the second support, and a grate interposed between said supports and having grate bars placed between said discs and at a right angle with respect to the rotation axis of said rasp element, said grate bars having opposed ends adjacent to said supports, and having a continuously inclining surface portion terminating adjacent the second support at an elevation higher than said second support.

2. In a bale rasp for reducing fibre bales in spinnig plants, at least one rotating rasp element including a plurality of axially spaced saw-tooth discs adapted to engage and reduce a fibre bale while moving at a right angle to the rotation axis of said element, a bale support on either side of said rasp element, said supports having bale support surfaces, means for reciprocatingly moving a bale from one of said supports onto said rasp element and therefrom onto the second support and past said rasp element back to the first support and so on, a rocking grate interposed between said supports and having grate bars placed between said discs and at a right angle with respect to the rotation axis of said rasp element, said bars having opposed ends adjacent to said supports, and means for rocking said bars in planes normal to the plane of said support surfaces for alternately elevating the ends of said grate bars above the plane of said support surfaces to raise the ends of the bars which are adjacent to the support receiving the bale from the rasp element.

3. In a bale rasp as defined in claim 2, means operated in response to the position of the bale moving means for actuating said rocking means in response to the position of said bale moving means.

4. In a bale rasp as defined in claim 2, an oscillatable shaft parallel to the rotation axis of said rasp element, said grate bars extending from and normal to said shaft, said rocking means being connected to said shaft for oscillating the latter and rocking said grate bars.

5. In a bale rasp for reducing fibre bales in spinning plants, two bale supports having coplanar bale support surfaces, two juxtaposed rasp elements rotating in opposite directions around parallel axes and being placed between said supports, each of said elements including a plurality of axially spaced saw-tooth discs adapted to engage and reduce a fibre bale while moving at a right angle to the rotation axes of said elements from one to the other of said bale supports, means for reciprocatingly moving a bale from one of said supports onto said rasp elements and therefrom onto the second support and past said rasp elements back to the first support and so on, a rocking grate interposed between said supports and comprising a shaft parallel to the rotation axes of and being placed in the plane of symmetry of said rasp elements and somewhat below the plane of said bale support surfaces, and grate bars connected to and extending at a right angle and in substantially opposite direction from said shaft to form two groups of bars, the bars of one group extending between the discs of one of said rasp elements and having free ends adjacent to one of said supports, the bars of the second group extending between the discs of the second rasp element and having free ends adjacent to the second of said supports, each group of bars being placed in a plane, the planes wherein said groups of bars are placed including and extending at a slight upward slant from the longitudinal axis of said shaft, and means for oscillating said shaft for alternatingly elevating the free ends of said bars above the plane of said support surfaces to raise the ends of the bars which are adjacent to the support receiving the bale from the rasp elements.

6. In a bale rasp for reducing fibre bales in spinning plants, a rotating rasp element including a plurality of spaced saw-tooth discs adapted to engage and reduce a fibre bale while moving at a right angle to the rotation axis of said element, a bale support on either side of said rasp element, said supports having coplanar surfaces slidably supporting a bale as it moves from one of said supports onto said rasp element and therefrom onto the second support, and a grate interposed between said supports and having grate bars placed between said discs and at a right angle with respect to the rotation axis of said rasp element, said grate bars having opposed ends adjacent said supports, the ends of the grate bars which are adjacent to the first support being placed at a lower elevation than the coplanar surfaces of said supports, and the ends of said grate bars which are adjacent to the second support being at a higher elevation than the coplanar surfaces of said supports.

References Cited in the file of this patent

UNITED STATES PATENTS

| 2,445,912 | Frost | July 27, 1948 |
| 2,938,239 | Leineweber et al. | May 31, 1960 |

FOREIGN PATENTS

| 1,191,797 | France | Apr. 13, 1959 |